US010942793B2

(12) United States Patent
Kimura et al.

(10) Patent No.: US 10,942,793 B2
(45) Date of Patent: Mar. 9, 2021

(54) INFORMATION PROCESSING SYSTEM

(71) Applicant: FUJITSU CLIENT COMPUTING LIMITED, Kanagawa (JP)

(72) Inventors: Masatoshi Kimura, Kawasaki (JP); Tomohiro Ishida, Kawasaki (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 0 days.

(21) Appl. No.: 16/727,398

(22) Filed: Dec. 26, 2019

(65) Prior Publication Data
US 2020/0210254 A1 Jul. 2, 2020

(30) Foreign Application Priority Data

Dec. 28, 2018 (JP) .................................. 2018-248670

(51) Int. Cl.
*G06F 9/54* (2006.01)
*G06F 13/16* (2006.01)
*G06F 11/32* (2006.01)
*G06F 9/4401* (2018.01)

(52) U.S. Cl.
CPC ............ *G06F 9/544* (2013.01); *G06F 9/4411* (2013.01); *G06F 11/324* (2013.01); *G06F 13/1668* (2013.01)

(58) Field of Classification Search
None
See application file for complete search history.

(56) References Cited

U.S. PATENT DOCUMENTS

| 7,707,465 B2 | 4/2010 | Boyd et al. |
| 8,615,623 B2 | 12/2013 | Hidaka et al. |
| 9,135,200 B2 * | 9/2015 | Shao ................... G06F 13/4022 |
| 9,319,493 B2 | 4/2016 | Imamura |
| 9,336,173 B1 * | 5/2016 | Sodke ................. G06F 13/4022 |
| 2004/0039950 A1 | 2/2004 | Okamoto et al. |

(Continued)

FOREIGN PATENT DOCUMENTS

| JP | 2004-086330 A | 3/2004 |
| JP | 2005-275818 A | 10/2005 |

(Continued)

OTHER PUBLICATIONS

Notification of Reason for Refusal issued in corresponding Japanese Patent Application No. 2018-248670 dated Sep. 3, 2019 (5 pages).

(Continued)

*Primary Examiner* — Shih-Wei Kraft
(74) *Attorney, Agent, or Firm* — Osha Bergman Watanabe & Burton LLP

(57) ABSTRACT

An information processing system includes: a plurality of information processing devices each including a processor; and a relay device that connects the information processing devices via an expansion bus and relays communication between the information processing devices. The relay device includes a control unit that represents, for one of the information processing devices, the rest of the information processing devices, and communicates with the one of the information processing devices as an integrated information processing device of the relay device and the rest of the information processing devices.

3 Claims, 7 Drawing Sheets

(56) References Cited

U.S. PATENT DOCUMENTS

| | | | |
|---|---|---|---|
| 2007/0266179 A1* | 11/2007 | Chavan | G06F 13/4022 709/250 |
| 2010/0042766 A1* | 2/2010 | Lai | G06F 13/4221 710/244 |
| 2011/0202703 A1* | 8/2011 | Bacher | G06F 13/385 710/313 |
| 2013/0054867 A1* | 2/2013 | Nishita | G06F 13/36 710/316 |
| 2014/0281069 A1* | 9/2014 | Mandapuram | G06F 13/4282 710/104 |
| 2015/0052284 A1 | 2/2015 | Maitra | |
| 2016/0098372 A1* | 4/2016 | Boyle | G06F 13/4072 710/313 |
| 2016/0299860 A1* | 10/2016 | Harriman | G06F 13/4282 |

FOREIGN PATENT DOCUMENTS

| | | |
|---|---|---|
| JP | 2007-200319 A | 8/2007 |
| JP | 2013-042245 A | 2/2013 |
| WO | 2008/018485 A1 | 2/2008 |

OTHER PUBLICATIONS

Office Action issued in the counterpart British Patent Application No. 1918766.5, dated Sep. 18, 2020 (10 pages).

* cited by examiner

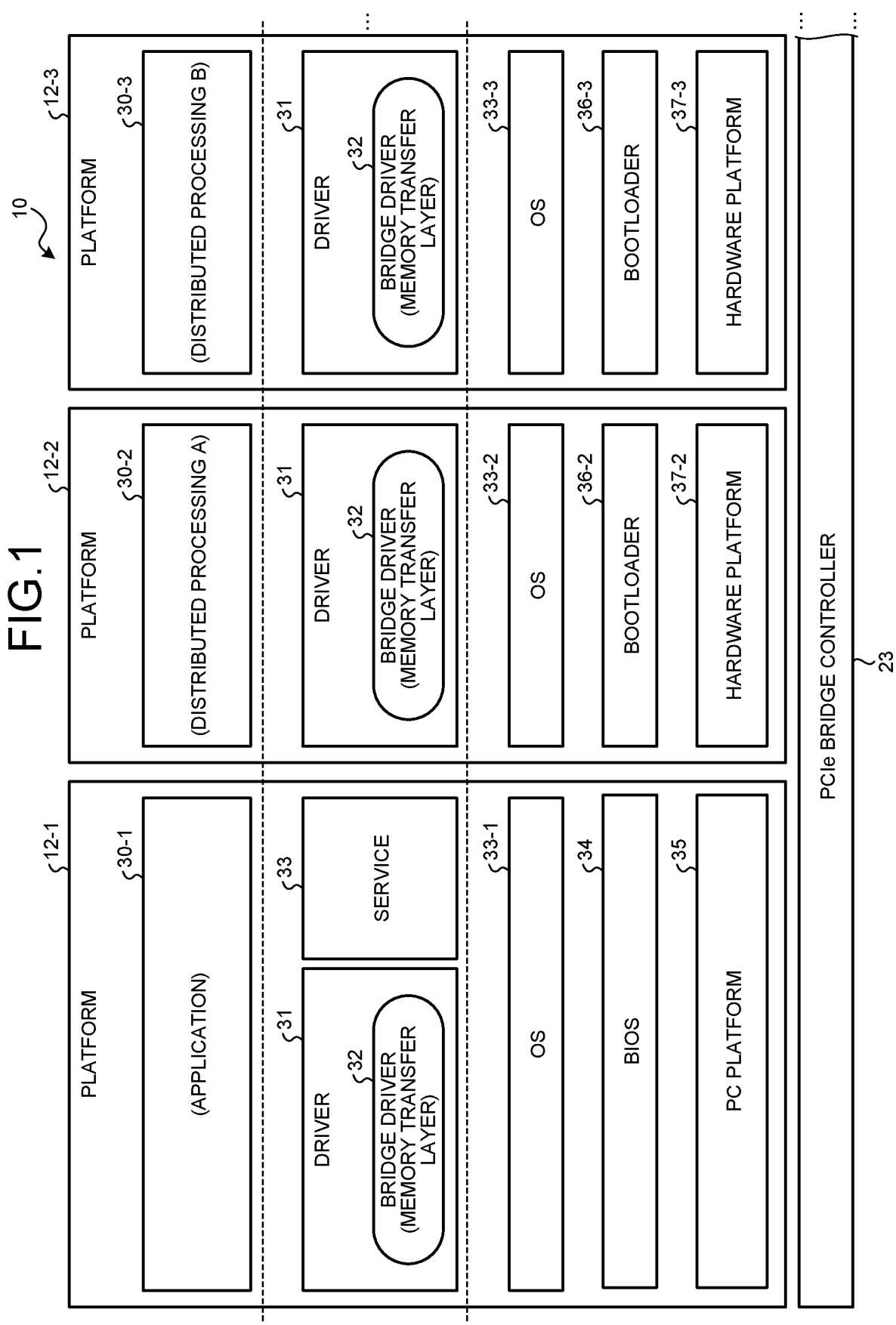

INFORMATION PROCESSING SYSTEM

CROSS-REFERENCE TO RELATED APPLICATIONS

This application is based upon and claims the benefit of priority from Japanese Patent Application No. 2018-248670, filed Dec. 28, 2018, the entire contents of which are incorporated herein by reference.

FIELD

Embodiments described herein relate generally to an information processing system.

BACKGROUND

Parallel computation using a plurality of calculators or arithmetic units is known. For example, information processing systems including calculators that exchanges data via an Ethernet (registered trademark) line are proposed.

In such an information processing system, one of the calculators functions as a host and the rest of the calculators function as devices to mutually exchange data.

However, in such a configuration, if the calculator serving as a host is brought into a disabled state, the entire information processing system may become inoperable. In addition, the host calculator will receive larger load in proportion to an increase in the number of the devices. Moreover, the functions and performance of the devices are stationary, therefore, for function enhancement, devices and device drivers may be added or modified. Thus, it is not easy to build a scalable information processing system.

Herein, building a scalable information processing system refers to building an information processing system such that at the time of function enhancement, for example, the host calculator can alter the functions and performance of the controlled devices via the existing device drivers without an increase in control load via the device drivers and change or addition of the device drivers.

It may also refer to building an information processing system in which distributed processing or parallel processing of the calculators connected to one device is easily changeable, and which can easily obtain different results of analysis not by changing input data but by changing output-data processing, e.g., analytical processing, for example.

It is preferable to provide a scalable information processing system including multiple calculators which are connected to one another and incorporate various operating systems.

SUMMARY

According to one embodiment, an information processing system includes a plurality of information processing devices each including a processor; and a relay device that connects the information processing devices via an expansion bus and relays communication between the information processing devices. The relay device includes a control unit that represents, for one of the information processing devices, the rest of the information processing devices, and performs communication with the one of the information processing devices as an integrated information processing device of the relay device and the rest of the information processing devices.

BRIEF DESCRIPTION OF THE DRAWINGS

FIG. 1 illustrates an exemplary software configuration of platforms;

DETAILED DESCRIPTION

Figure 2A:
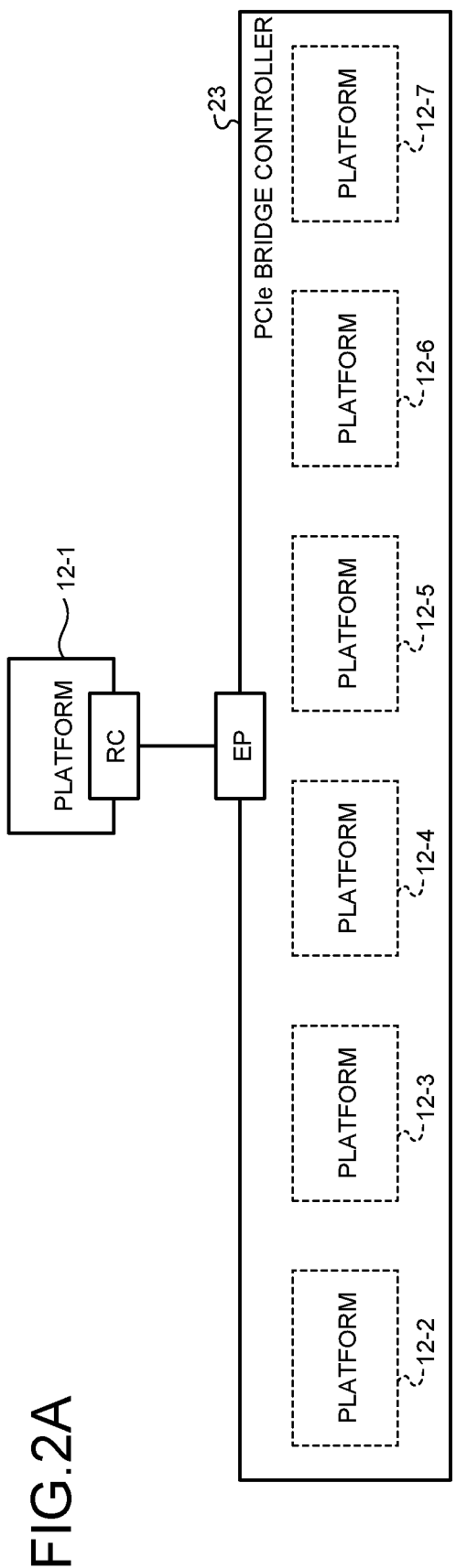
FIGS. 2A and 2B illustrate how one platform sees the other platforms.

Hereinafter, an embodiment of an information processing system will be described with reference to the accompanying drawings. The following embodiment is merely exemplary and not intended to exclude various aspects or features and techniques not explicitly described in the embodiment. That is, the embodiment can be variously modified without departing from the scope thereof. The embodiment can include additional functions or elements in addition to the elements illustrated in the drawings.

Embodiment

In the following, a PCI Express (PCIe, registered trademark) will be described as an example of an expansion bus 23*b*.

FIG. 1 illustrates an exemplary software configuration of platforms. An information processing system includes a platform 12-1 to a platform 12-7. However, FIG. 1 depicts platforms 12-1 to 12-3 alone for better understanding.

The platform 12-1 to the platform 12-7 may include micro processing units (MPUs) provided by different vendors. The platform 12-1 performs various operations under the control of an application 30-1.

The platform 12-1 incorporates a basic input output system (BIOS) 34 for booting up a bootloader. The bootloader detects and boots an operating system (OS) 33-1, such as Windows (registered trademark).

Thus, the OS 33-1 reads various drivers 31 including a bridge driver (memory transfer layer) 32 for controlling a PCIe bridge controller 23 including a control unit 23*a*, electrically accesses the PCIe bridge controller 23 via the bridge driver 32 and a PC platform 35, and communicates with the other platforms 12-2 to 12-7, thereby performing actual operation. Hereinafter, the use of the PC platform 35 will be described by way of example; however, the other platforms can also be applied in the same manner. The PCIe bridge controller 23 is an exemplary relay device.

Next, the platforms 12-2 to 12-7 will be described. The platforms 12-2 to 12-7 have the same configuration, so that the platform 12-2 will be described as a representative. The platform 12-2 performs various operations under the control of an application 30-2 for distributed processing A. The platform 12-3 has the same configuration as the platform 12-2 except for an application 30-3 for distributed processing B, therefore, a description thereof is omitted.

The platform 12-2 incorporates a bootloader 36-2, and the bootloader detects and boots up an OS 33-2, such as Linux (registered trademark).

Thus, the OS 33-2 reads a bridge driver 32 for controlling the PCIe bridge controller 23, electrically accesses the PCIe bridge controller 23 via the bridge driver 32 and a hardware platform 37-2, and communicates with the other platforms 12-1 and 12-3 to 12-7, thereby performing actual operation. The OS 33-2 executes a service 33 (software) in the background. The service 33 is for execution of a specific function without communicating with a user.

In such a configuration, the platforms 12-1 to 12-7 are independently operable not to affect other driver configurations.

Figure 2B:
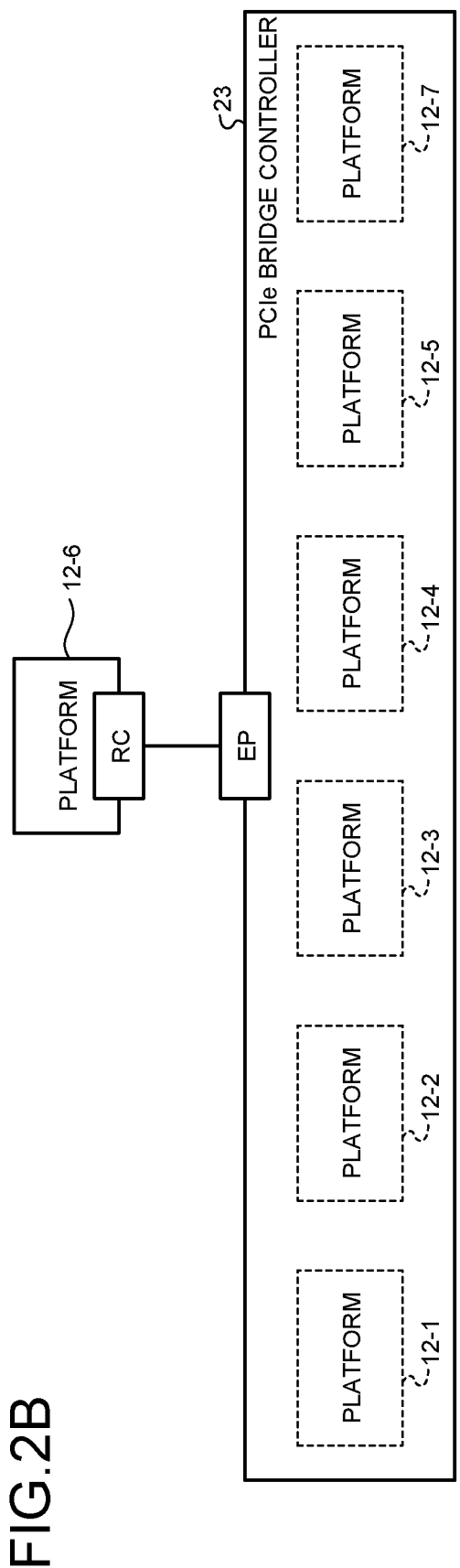

FIGS. 2A and 2B illustrate how one of the platforms sees the other platforms. As one example, the one platform is the platform 12-1 or the platform 12-6, and FIGS. 2A and 2B depict how the platform 12-1 or the platform 12-6 sees the rest of the platforms.

FIG. 2A illustrates the platform 12-1 in communication with the other platforms 12-2 to 12-7 via the PCIe bridge controller 23.

In this case, the platform 12-1 sees the PCIe bridge controller 23 alone, and the platforms 12-2 to 12-7 are masked by the PCIe bridge controller 23 and seem to be non-existent.

That is, the platform 12-1 functions as a root complex. In communicating with the platforms 12-2 to 12-7, the platform 12-1 appears to communicate with the PCIe bridge controller 23 being the sole endpoint.

In FIG. 2B, the platform 12-6 sees the PCIe bridge controller 23 alone, and the platforms 12-1 to 12-5 and the platform 12-7 are masked by the PCIe bridge controller 23 and seem to be non-existent.

That is, the platform 12-6 functions as a root complex. In communicating with the platforms 12-1 to 12-5 and 12-7, the platform 12-6 appears to communicate with the PCIe bridge controller 23 being the sole endpoint. The same applies to the platforms 12-2 to 12-5 and 12-7.

Consequently, all the platforms 12-1 to 12-7 see only the PCIe bridge controller 23 being one device to control via the device drivers. The other platforms connected via the PCIe bridge controller 23 are masked and invisible. Each of the platforms recognizes or regards the PCIe bridge controller 23 and all the other platforms as a single information processing device. Because of this, each of the platforms can continue its processing without the need to change the device driver, irrespective of change in functions and performance implemented by one or two or more of the platforms, which enables the construction of a scalable information processing system as a whole.

In addition, in the case of managing the entire information processing system 10 with one platform (for example, the platform 12-1), the one platform transmits an application in advance via the PCIe bridge controller 23, to be able to allocate the content and order of processing to the platforms 12-2 to 12-7 being calculators connected to the PCIe bridge controller 23 as one device. This facilitates changing the content of processing such as distributed processing or parallel processing or allocation of processing. This consequently makes it possible to build a scalable information processing system 10 which can easily obtain output data as different results of analysis not by changing input data but by changing the processing (such as analytical processing), for example.

Figure 3:
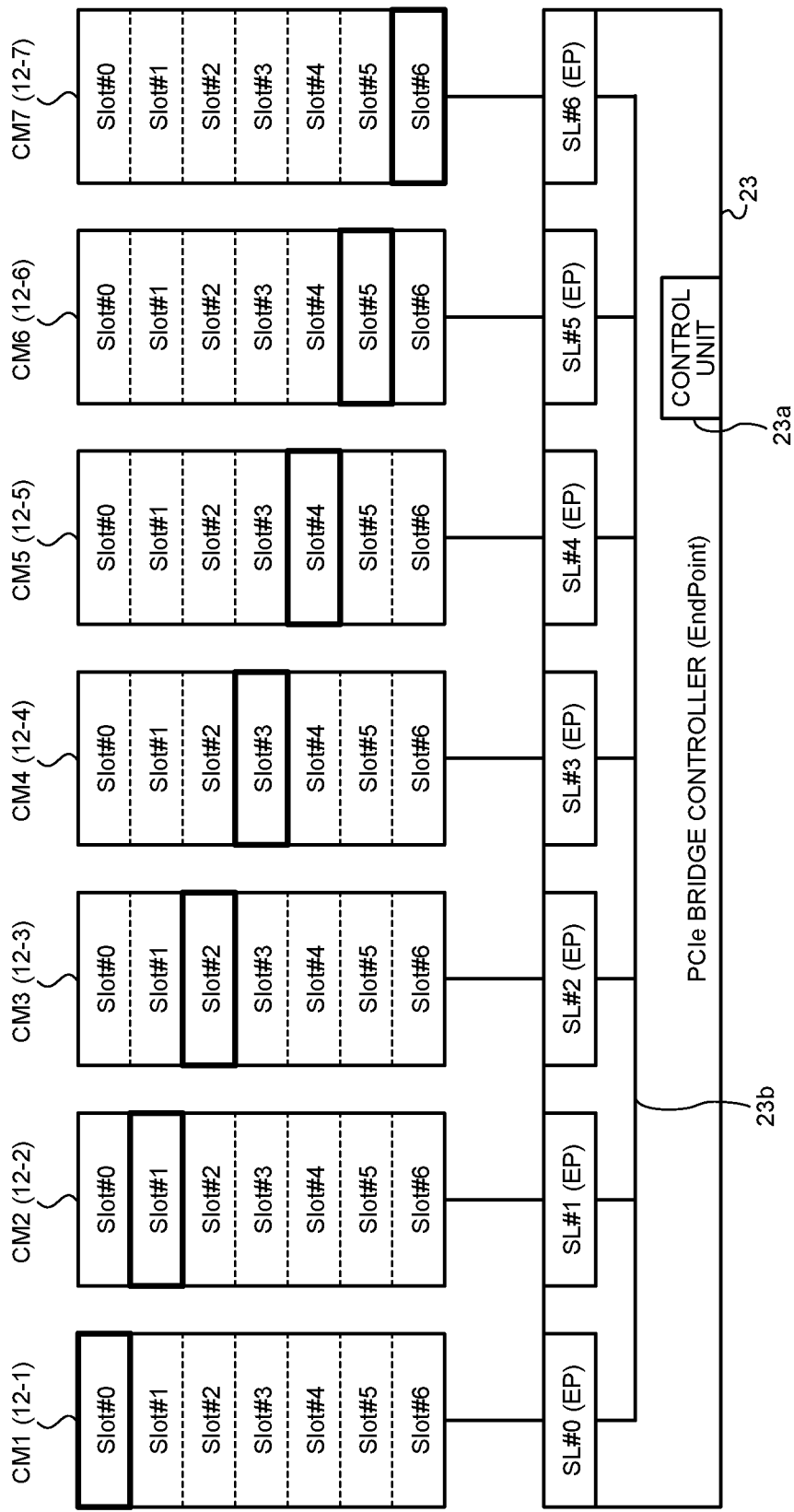
FIG. 3 illustrates an exemplary configuration of common memories of the respective platforms.

FIG. 3 illustrates an exemplary configuration of common memories of the respective platforms. The platforms 12-1 to 12-7 are inserted in slots SL #0 to SL #6 of the PCIe bridge controller and electrically connected mutually. The platforms 12-1 to 12-7 include common memories CM1 to CM7 having the same configuration, respectively. The common memories CM1 to CM7 each include a first region Slot #0 to a seventh region Slot #6.

In the common memory CM1, the first region Slot #0 is a region to which data to be received by the platform 12-1 from the platforms 12-2 to 12-7 is written, and the second region Slot #1 is a region to which the platform 12-1 writes data (including an application) to be transmitted to the platform 12-2. Similarly, the third region Slot #2 to the seventh region Slot #6 are regions to which the platform 12-1 writes data to be transmitted to the platforms 12-4 to 12-7, respectively.

In the common memory CM2, the second region Slot #1 is a region to which data to be received by the platform 12-2 from the other platforms 12-1 and 12-3 to 12-7 is written, and the first region Slot #0 and the third region Slot #2 to the seventh region Slot #6 are regions to which the platform 12-2 writes data to be transmitted to the platforms 12-1 and 12-3 to 12-7, respectively.

In the common memory CM3, the third region Slot #2 is a region to which data to be received by the platform 12-3 from the platforms 12-1, 12-2, and 12-4 to 12-7 is written, and the first region Slot #0, the second region Slot #1, and the fourth region Slot #3 to the seventh region Slot #6 are regions to which the platform 12-3 writes data to be transmitted to the platforms 12-1, 12-2, and 12-4 to 12-7, respectively.

In the common memory CM4, the fourth region Slot #3 is a region to which data to be received by the platform 12-4 from the platforms 12-1 to 12-3 and 12-5 to 12-7 is written, and the first region Slot #0 to the third region Slot #2 and the fifth region Slot #4 to the seventh region Slot #6 are regions to which the platform 12-4 writes data to be transmitted to the platforms 12-1 to 12-3 and 12-5 to 12-7, respectively.

In the common memory CM5, the fifth region Slot #4 is a region to which data to be received by the platform 12-5 from the platforms 12-1 to 12-4, 12-6, and 12-7 is written, and the first region Slot #0 to the fourth region Slot #3, the sixth region Slot #5, and the seventh region Slot #6 are regions to which the platform 12-5 writes data to be transmitted to the platforms 12-1 to 12-4, 12-6, and 12-7, respectively.

In the common memory CM6, the sixth region Slot #5 is a region to which data to be received by the platform 12-6 from the platforms 12-1 to 12-5 and 12-7 is written, and the first region Slot #0 to the fifth region Slot #4 and the seventh region Slot #6 are regions to which the platform 12-6 writes data to be transmitted to the platforms 12-1 to 12-5 and 12-7, respectively.

In the common memory CM7, the seventh region Slot #6 is a region to which data to be received by the platform 12-7 from the platforms 12-1 to 12-6 is written, and the first region Slot #0 to the sixth region Slot #5 are regions to which the platform 12-7 writes data to be transmitted to the platforms 12-1 to 12-6, respectively.

As configured above, when one of the platforms writes, to a given address of a corresponding region, data to be transmitted to another platform, the PCIe bridge controller 23 is notified of the given address via the device driver.

The PCIe bridge controller 23 determines the common memory of the platform as a transfer destination of the written data from the notified address, and transfers and writes data to the address of the corresponding region, that is, the same address as that of the region to which the platform being a source has written the data.

For example, the platform 12-2 performs computation to target data designated by the platform 12-1 and returns resultants to the platform 12-1 in the following manner.

The platform 12-1 writes the target data to a given address of the second region Slot #1 of the common memory CM1.

Then, the device driver of the platform 12-1 notifies the PCIe bridge controller 23 of address information on the given address of the second region Slot #1 of the common memory CM1.

The PCIe bridge controller 23 analyzes the address information and writes the target data to a corresponding address of the second region Slot #1 of the common memory CM2 via the device driver of the platform 12-2.

The platform 12-2 then reads the target data from the second region Slot #1 of the common memory CM2, subjects the read target data to computation, and writes a resultant to a given address of the first region Slot #0 of the common memory CM2.

The device driver of the platform 12-2 notifies the PCIe bridge controller 23 of address information on the given address of the first region Slot #0 of the common memory CM2.

The PCIe bridge controller 23 analyzes the address information and writes the target data to a corresponding address of the first region Slot #0 of the common memory CM1 via the device driver of the platform 12-1.

Consequently, the platform 12-1 receives the resultant of the computation by reading it from the corresponding address of the first region Slot #0 of the common memory CM1.

The following will describe more detailed operations.

First, a data write operation will be described. Herein, the platform 12-1's data write operation WR to the platform 12-6 is described by way of example.

Figure 4:
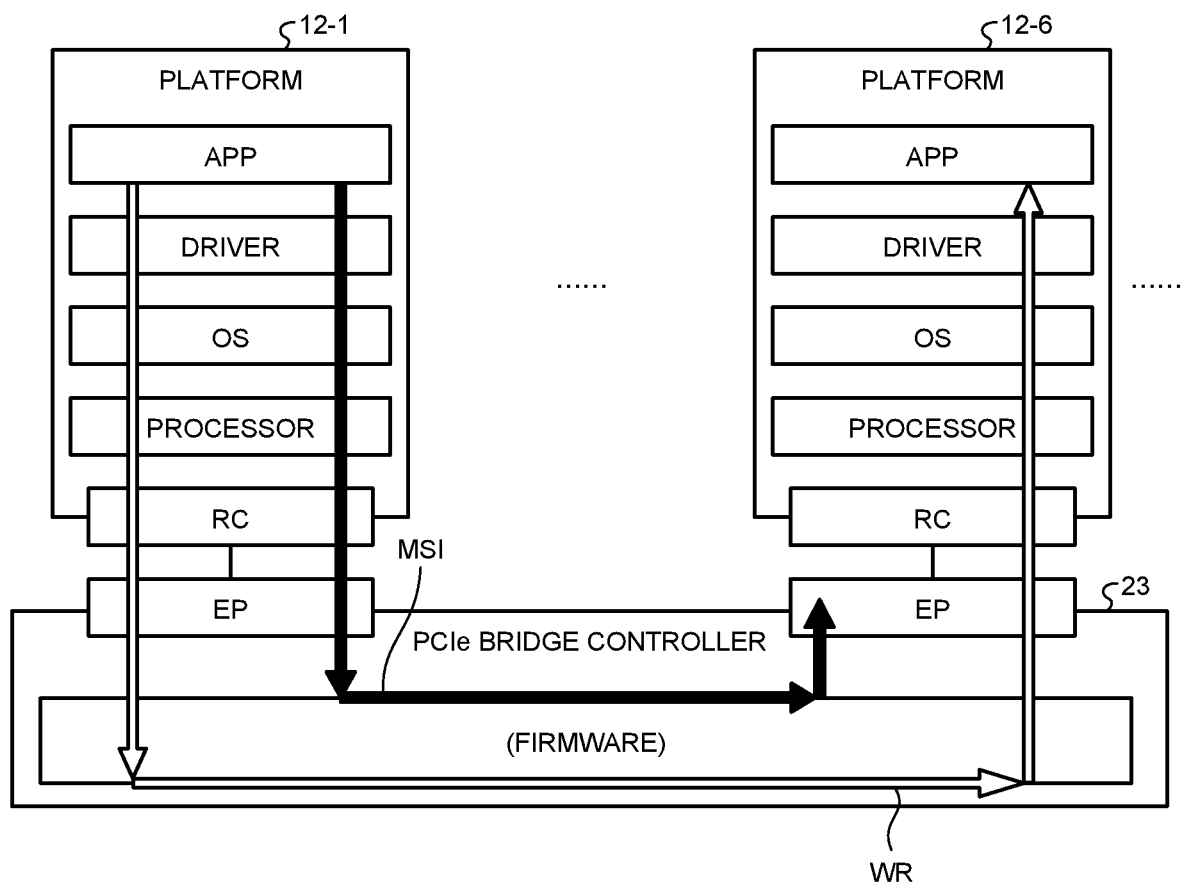
FIG. 4 illustrates a data write operation.
Figure 5:
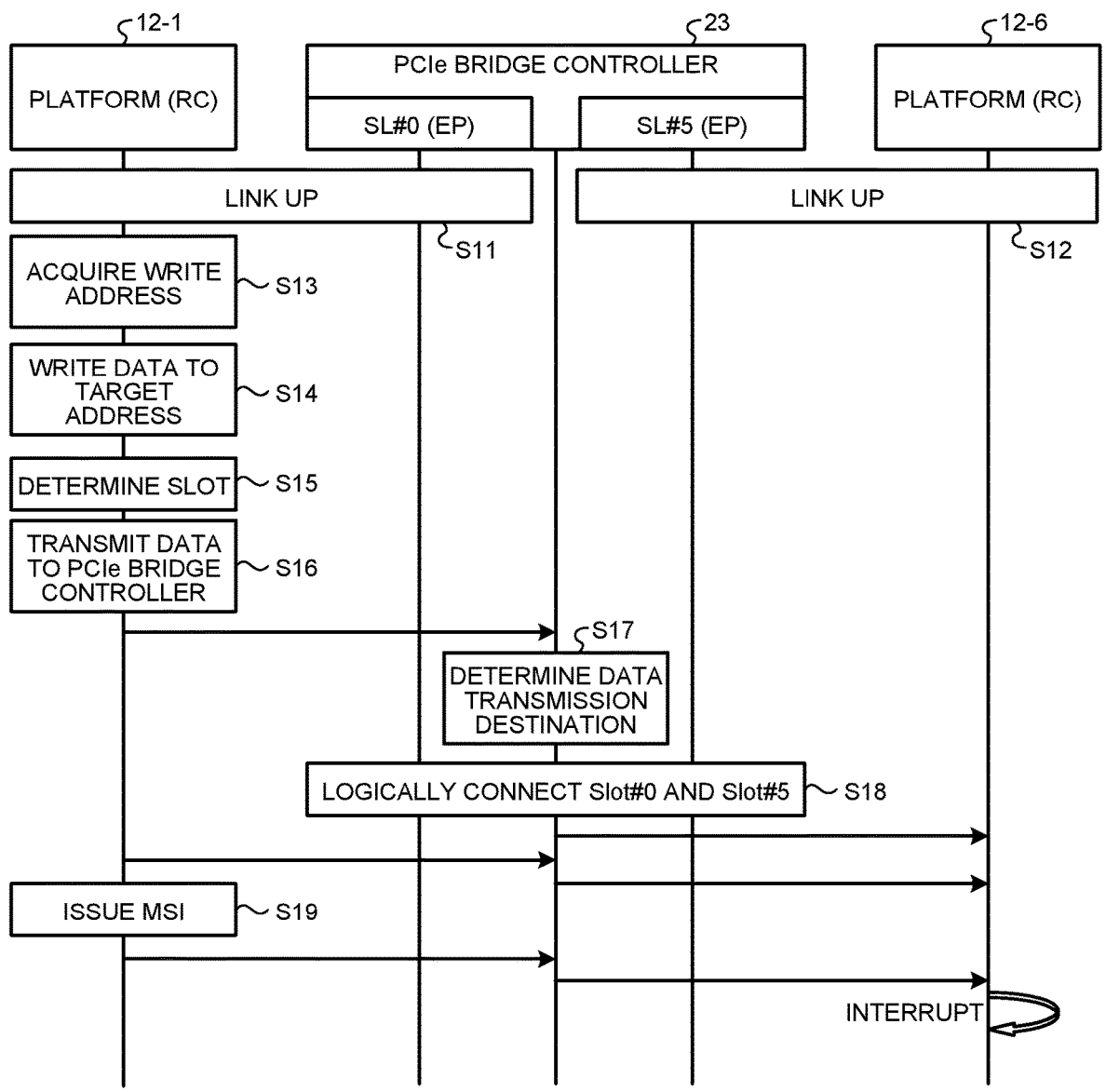
FIG. 5 is a timing chart of the data write operation.

FIG. 4 illustrates the data write operation WR. FIG. 5 is a timing chart of the data write operation WR.

As illustrated in FIG. 4, the platform 12-1 and the platform 12-6 each include an application (denoted by APP in FIG. 4), a device driver for the bridge controller (denoted as DRIVER in FIG. 4), an operating system (OS), and a processor. The platform 12-1 and the platform 12-6 each serve as a root complex (RC) in one-to-one connection to the PCIe bridge controller 23 being an endpoint (EP).

In this case, as illustrated in FIG. 5, the platform 12-1 being the root complex is connected to the PCIe bridge controller 23 via the first physical slot SL #0 while a link is established (in Step S11). The platform 12-6 being the root complex is connected to the PCIe bridge controller 23 via the physical sixth slot SL #5 while a link is established (in Step S12).

In this state, the platform 12-1 acquires a given write address (target address) of the common memory CM1 for data write to the platform 12-6 (Step S13). Then, the platform 12-1 writes data to the target address of the common memory CM1 (Step S14).

Subsequently, the platform 12-1 determines a physical slot of a destination of data transmission (Step S15), and transmits data (address data) to the PCIe bridge controller 23 (Step S16).

As a result, the PCIe bridge controller 23 analyzes the address data to determine a transmission destination of the data (Step S17). In this example, the PCIe bridge controller 23 determines the platform 12-6 as the transmission destination.

The PCIe bridge controller 23 logically connects the sixth region Slot #5 of the common region CM1 and the sixth region Slot #5 of the common region CM6 corresponding to the first slot SL #5 connected to the platform 12-1 and the sixth slot SL #5 connected to the platform 12-6 (Step S18).

As a result, the data is transferred and written from the target address of the first region Slot #0 of the common memory CM1 to the target address of the sixth region Slot #5 of the common memory CM6.

Subsequently, the platform 12-1 issues, to the platform 12-6 via the PCIe bridge controller 23, a message signaled interrupt (MSI) which is an interrupt via a PCIe bus as a memory transaction (Step S19).

Thus, the platform 12-6 understands that the data has been written to the common memory CM6, and the application of the platform 12-6 reads the data from the sixth region Slot #5 of the common memory CM6 and subjects the data to a given computation.

Next, a data read operation will be described.

Herein, the platform 12-1's data read operation DR from the platform 12-6 is described by way of example.

Figure 6:
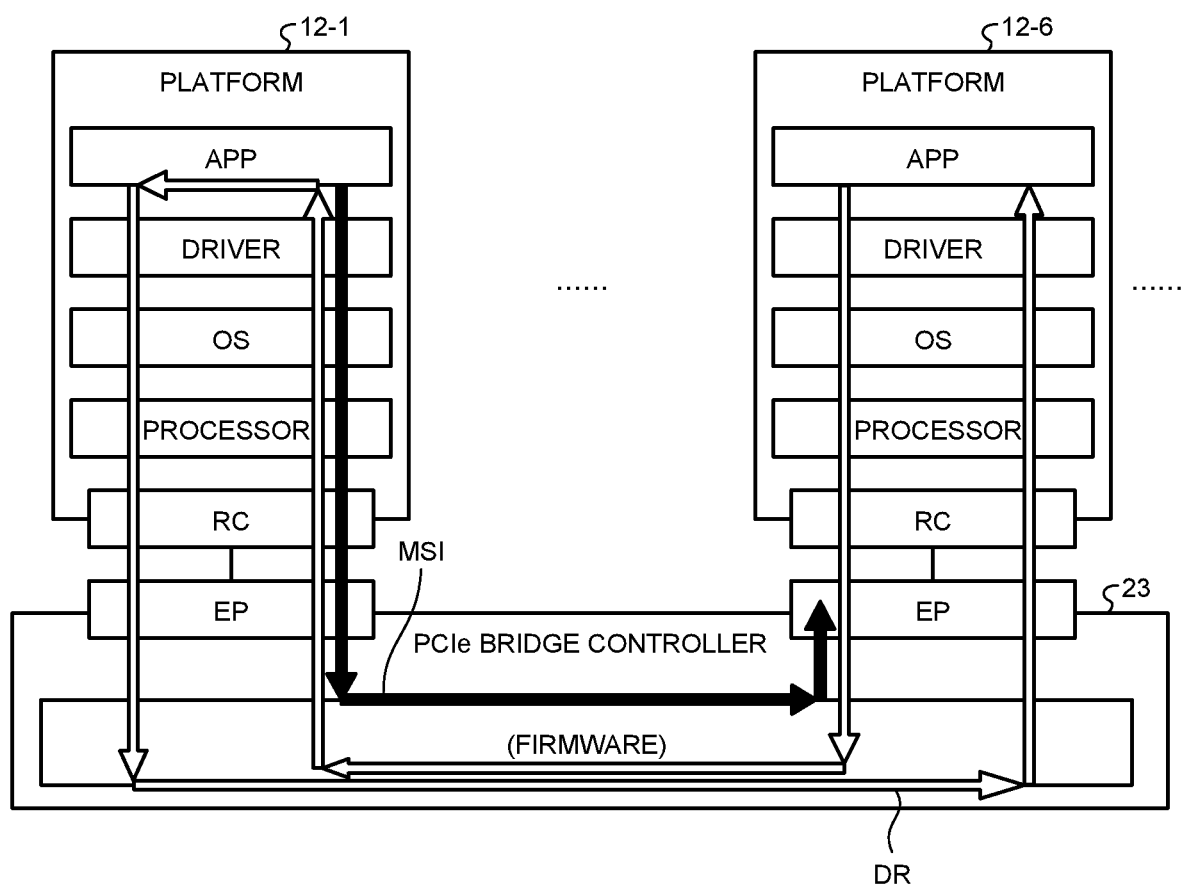
FIG. 6 illustrates a data read operation.

FIG. 6 illustrates the data read operation DR.

Figure 7:
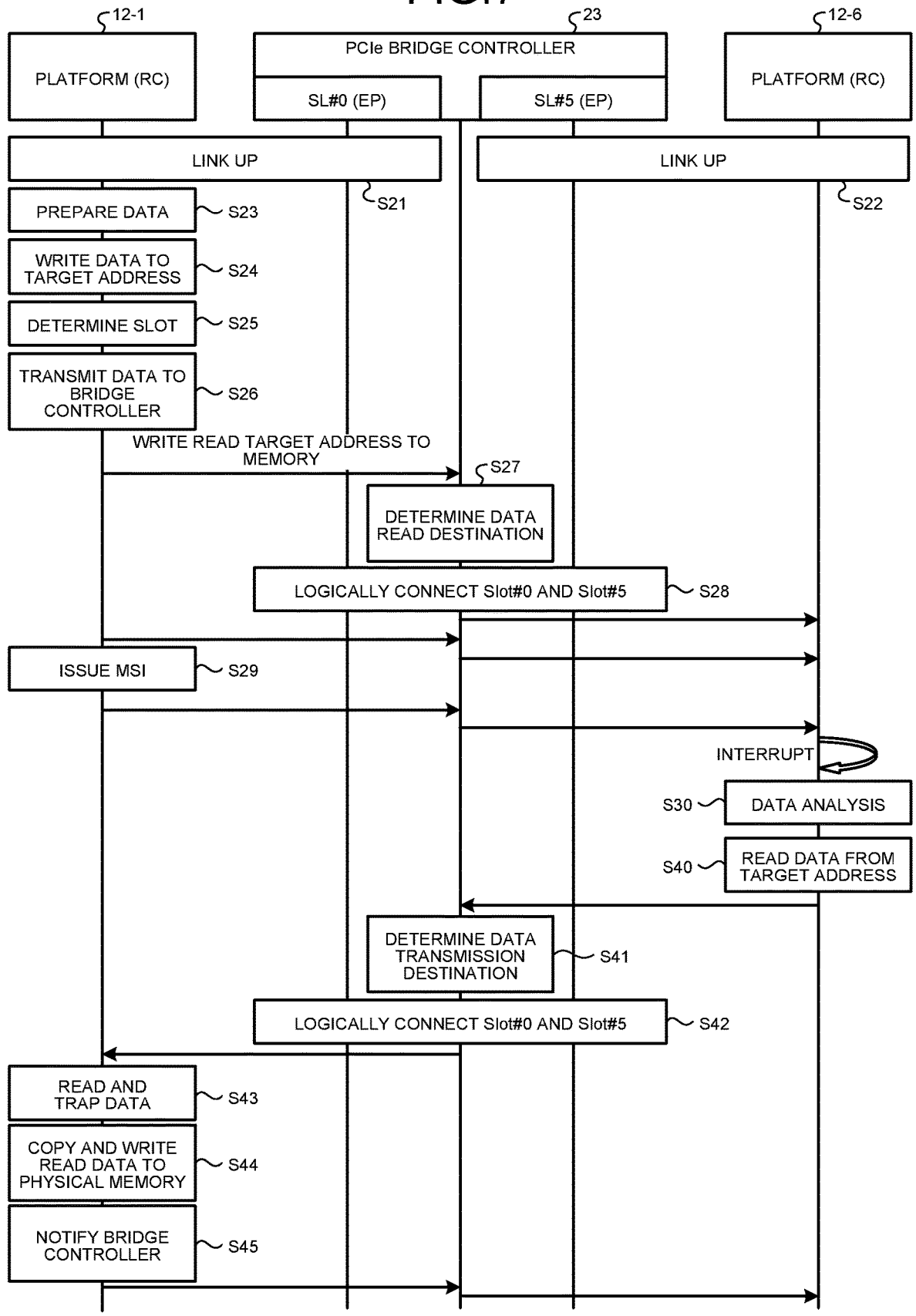
FIG. 7 is a timing chart of the data read operation.

FIG. 7 is a timing chart of the data read operation DR.

As in FIG. 4, the platform 12-1 and the platform 12-6 in FIG. 6 each include an application (denoted by APP in FIG. 6), a device driver for the PCIe bridge controller (denoted by DRIVER in FIG. 6), an operating system (OS), and a processor. The platform 12-1 and the platform 12-6 each serve as a root complex (RC) in one-to-one connection to the PCIe bridge controller 23 being an endpoint (EP).

In this case, as illustrated in FIG. 7, the platform 12-1 as the root complex is connected to the PCIe bridge controller 23 via the first physical slot SL #0 while a link is established (in Step S21). The platform 12-6 as the root complex is connected to the PCIe bridge controller 23 via the sixth physical slot SL #5 while a link is established (in Step S22).

In this state, the platform 12-1 prepares read address (target address) data for reading data from the platform 12-6 (Step S23). The platform 12-1 then writes the read address data to a given target address of the common memory CM1 (Step S24).

Subsequently, the platform 12-1 determines a physical slot of a destination of data transmission (Step S25), and transmits the read address data to the PCIe bridge controller 23 (Step S26).

As a result, the PCIe bridge controller 23 translates the read address data to determine a read destination of the data (Step S27).

In this example, the PCIe bridge controller 23 determines the platform 12-6 as the read destination of the data.

Then, the PCIe bridge controller 23 logically connects the sixth region Slot #5 of the common region CM1 and the sixth region Slot #5 of the common region CM6 corresponding to the first slot SL #0 connected to the platform 12-1 and the sixth slot SL #5 connected to the platform 12-6 (Step S28).

Subsequently, the platform 12-1 issues, to the platform 12-6 via the PCIe bridge controller 23, a message signaled interrupt (MSI) which is an interrupt via the PCIe bus as memory transaction (Step S29).

Consequently, the interrupted platform 12-6 understands through data analysis (Step S30) that a data read request has been issued. The application of the platform 12-6 reads data from the target address of its own memory, writes the read data to the address of the first region Slot #0 of the common memory CM6 designated by the platform 12-1, and notifies the PCIe bridge controller of the event that the data has been written (Step S40).

Thereby, the PCIe bridge controller 23 determines a transmission destination of the data (Step S41), and the PCIe bridge controller 23 logically connects the first region Slot #0 of the common region CM1 and the first region Slot #0 of the common region CM6 corresponding to the first slot SL #0 connected to the platform 12-1 and the sixth slot SL #5 connected to the platform 12-6 (Step S42).

Then, the platform 12-1 reads and traps data from the read address of the designated first region Slot #0 (Step S43).

Subsequently, the platform 12-1 copies and writes the read data into its own physical memory (Step S44).

The platform 12-1 notifies the PCIe bridge controller 23 and the platform 12-6 of the event that the data has been read, and terminates the processing (Step S45).

As described above, according to the present embodiment, each of the platform 12-1 to the platform 12-7 can read and write data without considering the other platforms, by effectively issuing a data read or write command to the PCIe bridge controller 23 serving as an endpoint via the common memories CM1 to CM7.

The above embodiment has described general data read and write operations by way of example. However, the above embodiment is applicable to the configuration that the platform 12-1 has a controlling function and installs an application on the other platforms 12-2 to 12-7.

That is, upon recognizing presence of the other platforms, for data read or write operation, the platform installing an application can simply issue a data read or write command via the common memories CM1 to CM7 to the PCIe bridge controller 23 being one device to control via the device driver. This enables all the platforms 12-1 to 12-7 to effectively continue the processing without change in the device drivers, irrespective of change in functions and performance implemented by one or two or more of the platforms, which makes it easier to build a scalable information processing system as a whole.

For example, one of the platforms (for example, platform 12-1) may manage one or two or more of the rest of the platforms (for example, platforms 12-2 to 12-7) and the entire information processing system 10. In such a case, the managing platform can simply give an instruction to the PCIe bridge controller 23 alone, to transfer an application beforehand to desired platforms to be able to allocate the content and order of processing to the platforms concerned. This can facilitate changing the content of processing such as distributed processing or parallel processing to be performed by the platforms concerned and changing the allocation of the processing.

This consequently makes it possible to construct a scalable information processing system 10 capable of easily obtaining different results of analysis, for example, by not changing input data to the managed platforms (i.e., output data from the managing platform) but changing output-data processing such as analytical processing.

The above embodiment has disclosed the features and configurations by way of example but is not limited to such examples. Various modifications can be made without departing from the gist of the embodiment. The configurations and operations of the embodiment can be selected or may be combined as needed or appropriate.

For example, FIG. 1 depicts the configuration that the PCIe bridge controller 23 is connectable to the seven platforms 12-1 to 12-7; however, the present embodiment is not limited to such an example. The PCIe bridge controller 23 may include six or less or eight or more platforms. In the drawings, the number of slots of the PCIe bridge controller 23 is set to seven for the sake of convenience. However, it is not limited to seven.

The above embodiment has described the PCIe (PCI express) as an example of the I/O interface for each element; however, the I/O interface is not limited to the PCIe. For example, the I/O interface for each element can be optionally set as long as it can serve to transfer data between a device such as a peripheral controller and a processor through a data transfer bus.

The data transfer bus may be a general-purpose bus through which data can be transferred at a high speed in a local environment (for example, one system or one device) provided in one housing, for instance.

The I/O interface may be either a parallel interface or a serial interface.

In the case of serial transfer, the I/O interface may be any interface which is point-to-point connectable and can transfer data on a packet basis. Alternatively, the I/O interface may include a plurality of lanes in the case of serial transfer.

The layer structure of the I/O interface may include a transaction layer for packet generation and decoding, a data link layer for error detection, and a physical layer for serial/parallel conversion.

The I/O interface may include a root complex at the uppermost hierarchy with one or two or more ports, an endpoint being an I/O device, a switch for increasing the number of ports, and a bridge that converts a protocol, for example.

For the I/O interface, a multiplexer may be provided to multiplex transmit data and a clock signal for transmission. In such a case, a reception side may be equipped with a demultiplexer to separate the data and the clock signal.

Through the disclosure as above, those skilled in the art can implement and manufacture the present embodiment.

Additional Aspects of Embodiment

Additional aspects of the above embodiment will be further described.

First Aspect

An information processing system of a first aspect of the embodiment includes a plurality of information processing devices each including a processor and a relay device. The relay device can connect the information processing devices via an expansion bus and relays communication between the information processing devices. The relay device includes a control unit that represents, for one of the information processing devices, the rest of the information processing devices, and performs communication with the one of the information processing devices as an integrated information processing device of the relay device and the rest of the information processing devices.

As configured above, the control unit of the relay device represents, for one of the information processing devices, the rest of the information processing devices, and performs communication with the one of the information processing devices as an integrated information processing device of the relay device and the rest of the information processing devices. Thus, the one of the information processing devices recognizes or regards the relay device and the other information processing devices as one information processing device. That is, even with a change in functions and performance implemented by one or two or more of the information processing devices, the one information processing device can regard the changed information processing device or devices as the same device or devices to control, and continue its processing. Thereby, a scalable information processing system can be built as a whole.

Second Aspect

In the information processing system of a second aspect of the embodiment according to the first aspect, the information processing devices each include a common memory region including a plurality of storage regions corresponding to the information processing devices, and issue data read and write instructions for the other information processing devices, to the relay device via the common memory region.

As configured above, the relay device can read and write data, simply referring to the common memory region. Thus, even with a change in functions and performance implemented by the entire information processing system, the relay device can regard the changed information processing system as the same system to control, and perform processing. This makes it possible to build a scalable information processing system as a whole.

Third Aspect

In the information processing system of a third aspect of the embodiment according to the second aspect, the relay device reads and writes data between two of the information processing devices in response to the instructions.

As configured above, if the information processing system is changed in a scalable manner, the relay device simply reads and writes data between the two information processing devices, and the information processing devices simply read and write data from and to the same relay device, which can simplify the processing sequence. Thus, the relay device can easily deal with the scalable information processing system.

Fourth Aspect

In the information processing system of a fourth aspect of the embodiment according to the second or the third aspect, the relay device specifies another one of the information processing devices to communicate from a data write address of the common memory region of the one of the information processing devices, and writes data having been written to the data write address, to the common memory region of the specified information processing device.

As configured above, the relay device can perform communication by simply exchanging data with the common memory regions. Thereby, the relay device can easily deal with a change in functions and performance of the entire information processing system or an increase in the number of the information processing devices, building a scalable system.

Fifth Aspect

In the information processing system of a fifth aspect of the embodiment according to one of the first aspect to the fourth aspect, the information processing device exchanges data with the relay device via a device driver of the relay device.

As configured above, with an increase in the number of the information processing devices, the information processing devices can be communicably connected to one another via the relay device by simply creating the device driver for the relay device. In addition, even if the functions and performance of the entire information processing system has changed, each of the information processing devices makes no change in the control with the same device driver, which makes it possible to easily construct a scalable system.

Sixth Aspect

In the information processing system of a sixth aspect of the embodiment according to one of the first aspect to the fifth aspect, the information processing devices function as root complexes with respect to the relay device. The relay device functions as an endpoint with respect to the information processing devices, and masks the rest of the information processing devices for the one of the information processing devices.

As configured above, all the information processing devices can equally communicate with the other information processing devices through communication with the relay device alone. Thus, the communication procedure remains unchanged even with a change in functions and performance of the entire information processing system, which makes it possible to easily build a scalable system.

According to one aspect of the embodiment, the control unit of the relay device communicates with one of the information processing devices representing the rest of the information processing devices. This can avoid applying communication load on any of the information processing devices and facilitate addition of a new information processing device or change in content of processing of each information processing device. Thereby, it is made possible to mutually connect multiple calculators incorporating various operating systems and build a scalable information processing system.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or aspects as would fall within the scope and spirit of the inventions.

What is claimed is:

1. An information processing system, comprising:
a plurality of information processing devices each comprising a processor; and
a relay device that mutually connects the information processing devices via an expansion bus and relays communication between the information processing devices, wherein
the relay device comprises a control unit that represents, for one of the information processing devices, the rest of the information processing devices, and communicates with the one of the information processing devices as an integrated information processing device of the relay device and the rest of the information processing devices,
each of the information processing devices comprises a common memory region including a plurality of storage regions that corresponds to the information processing devices, and issues data read and write instructions for other ones of the information processing devices to the relay device via the common memory region,
the relay device specifies another one of the information processing devices to communicate from a data write address of the common memory region of the one of the information processing devices, and writes data that were written to the data write address to the common memory region of the specified information processing device,
the information processing devices function as root complexes with respect to the relay device, and
the relay device functions as an endpoint with respect to the information processing devices and masks the rest of the information processing devices for the one of the information processing devices.

2. The information processing system according to claim 1, wherein
the relay device reads and writes data between two of the information processing devices in response to the instructions.

3. The information processing system according to claim 1, wherein the information processing devices exchange data with the relay device via a device driver of the relay device.

* * * * *